United States Patent Office 3,692,571
Patented Sept. 19, 1972

3,692,571

METHOD OF REDUCING THE MOBILE ION CONTAMINATION IN THERMALLY GROWN SILICON DIOXIDE

Douglas Roy Colton, Kanata, Ontario, and Yiu Chung Cheng and Rudolph John Kriegler, Ottawa, Ontario, Canada, assignors to Northern Electric Company Limited, Montreal, Quebec, Canada No Drawing. Filed Nov. 12, 1970, Ser. No. 89,097
Int. Cl. H011 7/00; C23c 11/08
U.S. Cl. 117—201 8 Claims

ABSTRACT OF THE DISCLOSURE

A typical process for thermally oxidizing a silicon semiconductor material is disclosed with an improvement consisting of the addition of a halogen substance, such as HCl, to the oxidizing atmosphere. This additional step in the oxidation process has the effect of obviating unstable electrical characteristics, caused by mobile ion contamination in thermally grown silicon dioxide. This process is particularly applicable in the manufacture of discrete and integrated MOSFET devices.

FIELD OF THE INVENTION

This invention relates to a method of thermally growing silicon dioxide, virtually free of mobile ion contamination. This method is particularly applicable to the thermal oxidation of a silicon material which may be used in the fabrication of semiconductor devices, particularly metal oxide silicon field effect transistors (MOSFETS) and integrated circuits comprised of MOSFETS.

DESCRIPTION OF THE PRIOR ART

MOSFET devices have in the past been noted for poor device performance evidenced by instability under temperature-bias stress. Sodium ion contaminates in the thermally grown silicon dioxide layer are believed to contribute to the mobile ion population in such devices and are generally recognized as being responsible for the unstable performance characteristics of the silicon dioxide dielectric. Ultraclean processing techniques and special materials have recently been used, with varying degrees of success, in the attempted formation of ultraclean, thermally grown, silicon dioxide, substantially free of mobile ion contamination. For example, combinations of silicon dioxide with silicon nitride and controlled phosphorous gettering have been tried. More recently, efforts have been made to exclude even trace amounts of alkali metals, particularly sodium, from the oxidation furnace atmosphere. Alkali barriers such as alumina, silicon carbide and silicon nitride liners have been used in combination with the conventional double-walled quartz tube. None of these methods have proven to be totally effective. The following are publications dealing with both the contamination of silicon dioxide and means and methods for reducing this contamination: "The Surface Properties of Oxidized Silicon" by E. Kooi, published in 1967 by Springer-Verlag; "Instabilities of M.O.S. Structure" by Y. Miura and Y. Matukura, in the Japanese Journal of Applied Physics, vol. 6, May 1967; "A Simple Method for Preparing Sodium-Free Thermally Grown Silicon Dioxide on Silicon" by F. Cocca, R. Cohen and J. Simonne in the Proceedings of the I.E.E.E., December 1967; and "Silicon Dioxide Thermally Grown in a Silicon Nitride Ambient" by R. A. Cohen and R. Wheeler, in the Journal of Electro-Chemical Society, vol. 116, No. 4, 1969. It is interesting to note that all the efforts to form silicon dioxide, substantially free of mobile ion contamination, to date, have been in the direction of developing ultraclean apparatus and methods to prevent any trace of an alkali metal being present in the processing atmosphere or in the silicon material during the processing of the silicon material.

SUMMARY OF THE INVENTION

It has been discovered that the introduction of a gaseous halogen substance to the oxidizing atmosphere, in a typical process of thermally growing silicon dioxide on the surface of a silicon substrate, has the effect of neutralizing the electrical characteristics of mobile ion contamination of the silicon dioxide.

The present invention is an improvement in a typical method of thermally oxidizing a silicon semiconductor material by heating the material in the presence of an oxidizing atmosphere. The improvement comprises the step of introducing a gaseous halogen substance of either chlorine, bromine, iodine, hydrogen chloride, hydrogen bromide or hydrogen iodide, to the oxidizing atmosphere to neutralize the electrical effects of mobile ions in the silicon dioxide.

DESCRIPTION OF THE PREFERRED EMBODIMENT

The process of thermally growing silicon dioxide on the surfaces of silicon semiconductor materials is well known to the semiconductor industry. The ranges of oxidizing time, temperatures and the wetness of the oxidizing atmosphere vary somewhat and are generally dictated by the particular apparatus being used and by the rate of growth, thickness and cleanliness requirements of the silicon dioxide layer.

The apparatus used for carrying out the oxidation process of the present invention is a typical oxidation furnace, into which a slice of silicon material (to be oxidized) is placed. Also necessary is a source of oxidizing atmosphere, which may be oxygen, water vapour or any combination thereof, and a source of a gaseous halogen substance.

In the process of thermally oxidizing a silicon slice and ensuring that a silicon dioxide layer is formed, which is substantially free of the electrical effects of mobile ions, an oxidizing atmosphere is established in a furnace tube and a gaseous halogen substance, such as hydrogen chloride or chlorine, is added to the oxidizing atmosphere. The temperature of the hot zone of the furnace tube is maintained sufficiently high to carry out oxidation within a reasonable period of time. Typical values are between about 600° C. and 1200° C. The slice is placed in the hot zone of the furnace tube for a period of time sufficient to grow the required thickness of oxide, whereafter the process is terminated by removing the slice to a clean nonreactive atmosphere or to a cooler zone of the furnace tube having a temperature sufficiently low to effectively terminate the oxidation process.

The above-described process may be applied to advantage with any well known oxidizing apparatus. Hydrogen bromide, bromine, hydrogen iodide and iodine are also applicable to this process, providing that all zones of the furnace and its connecting apparatus are maintained at a sufficiently high temperature that they do not become clogged with the halogen substance in its liquid and solid state.

The optimum ratio of the halogen substance, to the oxidizing atmosphere, may best be determined by experimentation with the particular apparatus being used. This entails the addition of any amount, such as a few parts per million up to a few parts per hundred of the halogen substance, to the oxidizing atmosphere until the unstable electrical effects of mobile ion contamination are substantially erased from test samples of slices being processed. In other words, to achieve best results, the required minimum concentration of the halogen substance in the oxidizing atmosphere is directly proportional to the typical contamination level normally experienced in the particular oxidizing apparatus at hand. However, it is preferred although not essential that the concentration of a halogen in the atmosphere should not exceed about 1.5% by volume and in the case of a hydrogen halogen about 3.0% by volume. Higher concentrations of the halogen substance have the effect of accelerating the oxide growth rate. Oxides so grown have a tendency toward pinholing resulting in a lower voltage breakdown, as is characteristic of any quickly grown silicon dioxide.

In any number of single controlled experiments to determine what concentration of a halogen substance will yield a substantially significant reduction in the effects of mobile ion contamination in the oxide, the minimum results, thus determined, usually vary by a considerable amount with relation to each other. This is attributable to the apparatus being used. More particularly, it is directly attributable to the initial contamination residing within the furnace tube and to diffusion of contaminates through the walls of the furnace tube. In fact, some structures of furnace tubes may initially yield oxides from the standard oxidation process which are relatively clean, but this is a condition which deteriorates with further processing of slices and cannot be readily reattained, with even an extensive cleaning of the tube and associated apparatus. The continuous use of a more than minimal concentration of a halogen substance, such as described above, in the apparatus during the practice of the process, always insures that an extremely clean oxide, that is an oxide substantially free of the effects of mobile ion contamination, is consistently available from the process.

The following typical examples of the process are given to further describe the invention and are not meant to limit the invention herein disclosed.

The hot zone temperature of an oxidation furnace having a double-walled quartz tube was established at about 1150° C. An atmosphere consisting of dry oxygen and hydrogen chloride in a concentration of between about 0.6% and 3.0% of the oxygen volume was established in the tube. A silicon slice was placed upon a quartz carrier and inserted into the hot zone for a period of about 2 hours after which the slice was removed from the furnace. The above example process was also practiced using an atmosphere of dry oxygen and chlorine in a concentration of between about 0.3% to 1.5% of the oxygen volume. Oxide thicknesses derived from both the example processes were between about 2500 angstroms and 3000 angstroms in thickness.

The following table shows qualitative test results of various samples of silicon dioxides thermally grown on silicon slices. The standard oxidation process was practiced using a dry oxygen atmosphere inside a double-walled quartz furnace tube. Slices oxidized by this process have been identified in the table as "Standard." The above standard oxidation process was also practiced using a silicon carbide liner within the furnace tube. Slices oxidized by this process have been identified in the table as "Silicon Carbide Liner." The standard process was practiced with the addition of hyrogen chloride and with the addition of chlorine to the dry oxygen atmosphere and thus slices oxidized by these processes have been identified in the table as "Hydrogen Chloride" and "Chlorine" respectively. For the purpose of evaluation a pattern of gold dots of approximately $5\times10^{-3}$ cm.$^2$ was evaporated onto the oxide surface and the capacitances of the resulting metal oxide silicon structures were measured as a function of applied bias. The capacitance-voltage characteristic allows the determination of the flat-band voltage in a sample which can be used as a measure of the charge in the oxide located near the silicon silicon-dioxide interface of the sample.

$\Delta V_{fb}$(BT) represents the change in flat-band voltage between the initial room temperature flat-band voltage and the room temperature flat-band voltage after an accelerated aging period, during which about +16 volts of bias was applied to the metallized surface of the silicon dioxide at a temperature of about 250° C. for a period of about 5 minutes.

A negative $\Delta V_{fb}$(BT) is an indication of the presence of mobile ions in the oxide. Under the present experimental circumstances 1 volt $\Delta V_{fb}$ corresponds to a shift to the oxide silicon interface of approximately $6\times10^{10}$ mobile ions per cm.$^2$ of the test area.

The tests were carried out using the high frequency C-V technique of measurment as described in "Investigation of Thermally Oxidized Silicon Surfaces Using Metal Oxide Semiconductor Structures" by A. S. Grove, B. E. Deal, E. H. Snow, and C. T. Sah in Solid State Electronics, vol. 8, pg. 145 (1965).

At least eight dots were measured on each of several sample slices of each process and the mean value and root means square deviation were computed and are given in Table 1.

TABLE 1.—COMPARISON BETWEEN OXIDE SAMPLES

| Process: | $\Delta V_{fb}$(BT) (volts) |
|---|---|
| Standard | $-12\pm6.5$ |
| Silicon carbide liner | $-1.65\pm0.31$ |
| Hydrogen chloride | $+0.22\pm0.15$ |
| Chlorine | $+0.32\pm0.07$ |

In Table 1, the hydrogen chloride samples and chlorine samples showed a small positive $\Delta V_{bf}$(BT), which is characteristic of only very clean oxides, as explained by Y. Miura and Y. Matukura in Nippon Electric Research and Development, vol. 9, pg. 115, 1967. Such oxides demonstrate substantially stable characteristic over a long period of time and over a wide temperature range. The oxygen samples grown using a tube having a silicon carbide liner show a definite negative shift, an indication of an undesirable but heretofore tolerated contamination of the silicon dioxide. The double-wall quartz apparatus used with only oxygen demonstrates a large shift of individually unpredictable magnitude. Oxides in such a contaminated state are most unsuitable for the production of MOSFETS, as such devices so fabricated are unstable.

The above-disclosed process is not limited only to application in the manufacture of MOSFET or MOSFET integrated circuit devices, but is applicable to any manufacture where thermally grown silicon dioxide, substantially free of the electrical effects of mobile ions, is required.

What is claimed is:

1. In a method of thermally growing a silicon dioxide layer on the surface of a silicon material comprising the step of:
heating the silicon material to a temperature of between about 600° C. and 1200° C. in the presence of an oxidizing atmosphere;
the improvement comprising the step of:
introducing into the oxidizing atmosphere a gaseous halogen substance selected from the group consisting of chlorine, bromine, iodine, hydrogen chloride, hydrogen bromide and hydrogen iodide to neutralize the electrical effects of mobile ions in the silicon dioxide layer.

2. A method as defined in claim 1 in which the gaseous halogen substance is selected from the group of chlorine and hydrogen chloride.

3. A method as defined in claim 2 in which the gaseous halogen substance is chlorine and is present in a concentration of between about a few parts per million and 1.5% by volume relative to the oxidizing atmosphere.

4. A method as defined in claim 3 in which the oxidizing atmosphere consists of oxygen.

5. The method defined in claim 4 in which the silicon material is heated to a temperature of about 1150° C. for a period of about two hours whereby the silicon dioxide layer thus grown is of a thickness of between about 2500 angstroms and 3000 angstroms.

6. A method as defined in claim 2 in which the gaseous halogen substance is hydrogen chloride and is present in a concentration between about a few parts per million and 3.0% by volume relative to the oxidizing atmosphere.

7. A method as defined in claim 6 in which the oxidizing atmosphere consists of oxygen.

8. The method defined in claim 7 in which the silicon material is heated to a temperature of about 1150° C. for a period of about two hours whereby the silicon dioxide layer thus grown is of a thickness of between about 2500 angstroms and 3000 angstroms.

References Cited

UNITED STATES PATENTS 3,260,626 7/1966 Schink .............. 148—186

ALFRED L. LEAVITT, Primary Examiner

B. J. LEWRIS, Assistant Examiner

U.S. Cl. X.R.

117—106 R

Notice of Adverse Decision in Interference

In Interference No. 98,403, involving Patent No. 3,692,571, D. R. Colton, Y. C. Cheng and R. J. Kriegler, METHOD OF REDUCING THE MOBILE ION CONTAMINATION IN THERMALLY GROWN SILICON DIOXIDE, final judgment adverse to the patentees was rendered Mar. 5, 1974, as to claim 7.

[*Official Gazette July 2, 1974.*]